United States Patent Office 3,508,565
Patented Apr. 28, 1970

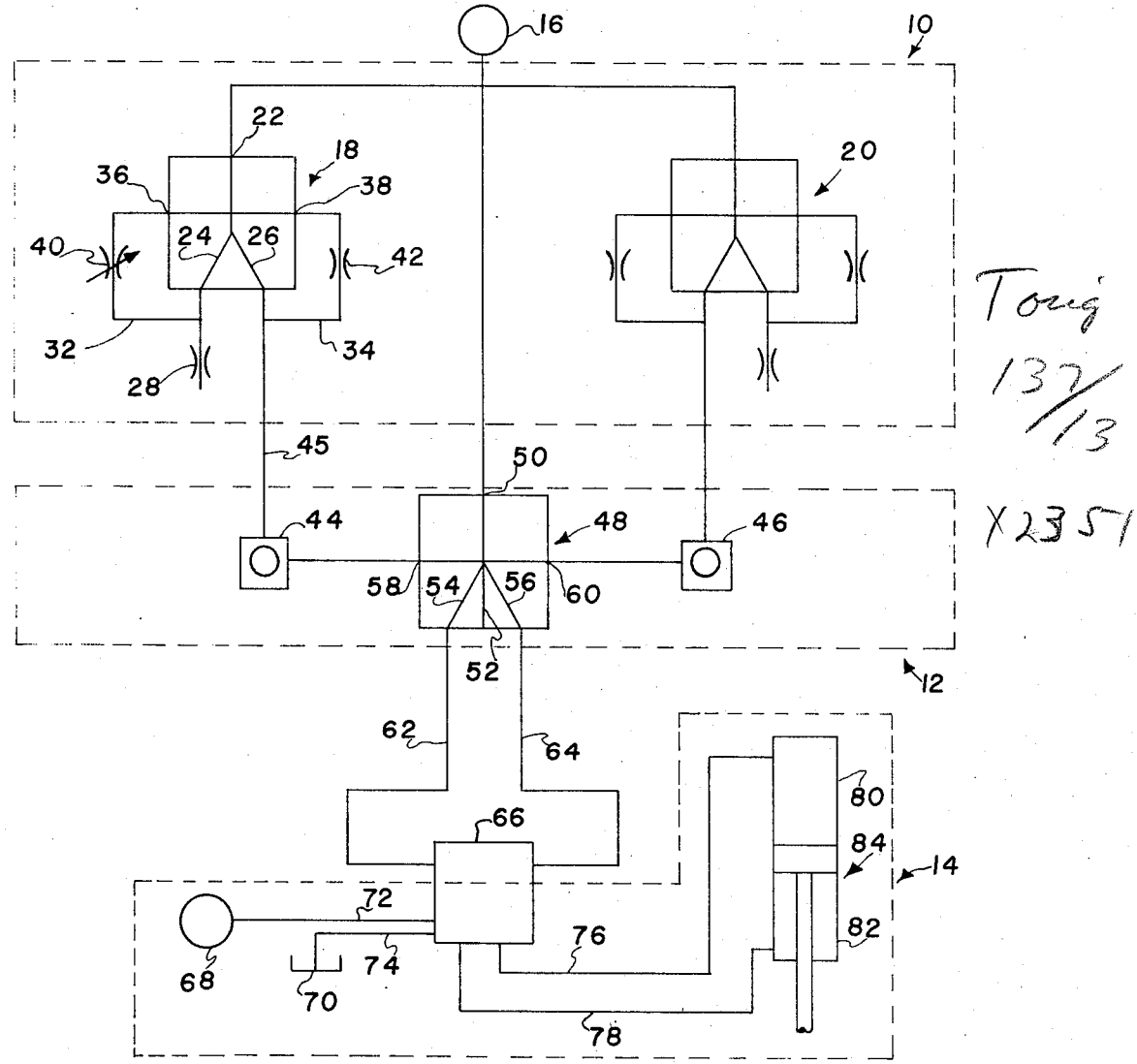

3,508,565
FLUID DEVICE
Lawrence D. Strantz, Washington, Ill., assignor to Westinghouse Air Brake Company, Peoria, Ill., a corporation of Pennsylvania
Filed Aug. 8, 1967, Ser. No. 659,112
Int. Cl. F15c 1/12
U.S. Cl. 137—81.5                10 Claims

ABSTRACT OF THE DISCLOSURE

A method and apparatus for transmitting a low pressure, pure fluid or fluidic signal through a conduit of a length greater than ten feet, the apparatus comprising a pair of digital, bistable oscillators, the first oscillator having a fixed capacitance and the second oscillator having a variable capacitance controlled in accordance with changes of a parameter being monitored. A standing wave fluid pulse output of the first and second oscillators is directed through lines to first and second capacitors, which are connected to control signal input ports of an analog, or proportional amplifier. The output of the proportional amplifier, the magnitude and direction of which is dependent of the relative fluid pulse frequencies generated by the oscillators, may be directed to an interface valve for controlling a high-pressure hydraulic system, or the like, in accordance with variations in the parameter being monitored.

FIELD OF INVENTION

This invention relates to pure fluid or fluidic systems utilizing fluid dynamic phenomena, such as a Coanda effect, for sensing, controlling, information processing, and/or actuation functions.

DESCRIPTION OF THE PRIOR ART

Recently, fluidic systems have gained favor in many industries for a multitude of applications. As has been recently appreciated, fluidic devices are advantageous in a control environment because they are relatively compact, inexpensive, reliable in spite of extreme environmental changes, and have no moving parts. Such devices are potentially well suitable for control of various components of construction, excavation, and off-highway vehicles because they are insensitive to vibration and shock, may be self-purging, and may be operated under extremely low operating pressures, such as a few pounds per square inch. However, utilization in such environments has been hindered because long line or conduit lengths may be required and transmission of a pure pressure signal of a relatively small magnitude and low pressure in line lengths in excess of ten feet has not been satifactory because of line losses and extended transmission times. This problem has been particularly troublesome in fluidic system operating at 2 or 3 p.s.i. for monitoring remote vehicle components, wherein the fluidic components of the system may be as much as 40 to 50 feet apart.

SUMMARY OF THE INVENTION

It is a general object of the present invention to provide a fluidic system which solves the problems heretofore noted.

In achieving this general object, the present invention provides a method of, and an apparatus for, transmitting a fluid signal of a small magnitude through a conduit of substantial length, the apparatus comprising a fluid pulse generating means associated with a source of fluid under pressure for generating a standing wave fluid pulse at varying frequencies. The output of the fluid pulse generating means is directed to the signal input port means of a proportional amplifier, the output magnitude and path of which is proportional to the frequency of the fluid pulse.

In the illustrated embodiment of the present invention, fluid flow through the proportional amplifier from a source of fluid under pressure is controlled in accordance with any differential pressure existing across first and second control signal input ports of the proportional amplifier which receive a fluid pulse from first and second digital oscillators.

BRIEF DESCRIPTION OF THE DRAWINGS

In describing the invention, reference will be made to the accompanying drawings in which:
The sole figure is a circuit diagram of a fluidic system according to the present invention.

DESCRIPTION OF THE PREFERRED EMBODIMENT

Referring in more detail to the single figure, the present invention generally provides a pure fluid or fluidic digital system 10 for monitoring a parameter and accordingly control the output of a fluidic analog system 12 which controls a high pressure hydraulic system 14 of a component to be actuated in accordanece with the parameter being monitored.

The digital system 10 comprises a source of fluid under pressure, such as a pneumatic compressor 16 in fluid communication with first and second digital, bistable, oscillators 18 and 20, respectively. The compressor is of a small capacity such as providing two c.f.m. at 3 p.s.i. The osciillator 18 comprises a supply port and passage 22 for directing flow from the compressor 16 through either first or second output passages or legs 24 and 26, respectively. A restriction 28 is provided in the output leg 24 which is vented to atmosphere and a pair of conduits 32 and 34 are directed from the output legs 24 and 26 to the control signal input ports and passages 36 and 38 which are in fluid communication with the supply and output passages 22, 24 and 26. A variable capacitor 40 is interposed in the conduit 32 and is adapted to be automatically varied, in any conventional manner, in accordance with a parameter to be monitored. Variation of the capacitance induces proportional variation of the frequency of the output pulse. The conduit 34 is provided with a restriction 42 and the output leg 26 is placed in fluid communication with a first capacitor 44 by a conduit or line 45 which may be of a length greater than ten feet.

It should be noted that the oscillator 18 is basically a bistable or flip-flop gate, such as produced by Fluidonics, Catalog Number FD-2212-2-1211, but with a portion of the flow from the output being redirected through restrictions to the control signal inputs whereby an oscillating output is provided. The second oscillator 20 is similar in construction to the first oscillator 18 but is of a fixed capacitance whereby it may serve as a reference against which the frequency of the output of the first oscillator 18 may be compared. The output of the fixed capacitance oscillator 20 is directed to a second capacitor 46.

The analog system 12 comprises an analog or proportional center tap amplifier 48, such as produced by Fluidonics, Catalog Number FD-2512-3-1321. The amplifier 48 includes a supply port and passage 50 which is connected to the compressor 16 for directing fluid flow through first, second and third output passages 52, 54 and 56 respectively, in accordance with pressure differential across control signal input ports and passages 58 and 60 which are in fluid communication with the supply and output passages 50, 52, 54 and 56. The output passages 54 and 56 are connected by conduits 62 and 64 to opposite sides of a transducer, such as a conventional interface valve 66.

The interface valve 66 is responsive to a low pressure signal to control a high pressure hydraulic system, this valve being connected to a hydraulic pump 68 and reservoir 70 by conduits 72 and 74. High pressure conduits 76 and 78 connect the valve 66 with head and rod ends 80 and 82 of a double acting, hydraulic cylinder 84 which is adapted to actuate an element or component to be controlled in accordance with the parameter being monitored.

Operation of the present invention is as follows. Depending upon the capacitance of the variable capacitor 40, a standing wave pulse frequency is established in the output leg 26 and is directed to the capacitor 44. Similarly, a pulse at a predetermined frequency is directed to the capacitor 46. The digital signal is then converted to an analog signal by virtue of the fact that the proportional amplifier functions as a frequency discriminator as follows. Fluid pressure in the capacitors is proportional to the frequency of the input pulse. Unless the pulse frequencies from both oscillators are the same, a pressure differential is induced across the control signal input ports 58 and 60, and a portion of the output from the proportional amplifier is redirected from the center output leg 52 to either the second or third output legs 54 and 56. With the fluid so redirected, the interface valve 66 is actuated to appropriately direct fluid to the head or rod ends of the cylinder 84 and thereby actuate a component in accordance with variations of the parameter being monitored.

The present invention may be applied to many control functions in a large vehicle, tractor or truck environment. For example, it is sometimes desired to control the depth of cut of an earthmoving scraper in accordance with tractor engine speed to facilitate operation of the engine at an optimum speed. To achieve this function, the variable capacitor 40 of the variable capacitance oscillator 18 may be operatively connected with a tractor engine governor rack so that capacitance and therefore pulse frequency transmission is varied in accordance with rack setting. The earthmoving scraper cutting edge may be mechanically connected to the hydraulic cylinder 84 to vary the elevation thereof in accordance with engine speed. In this instance, it should be apparent that the conduit 45, connecting as it does the variable capacitance oscillator 18 monitoring the tractor engine speed with the proportional amplifier, will be substantially longer than the conduit connecting the fixed capacitance oscillator with the amplifier since the fixed capacitance oscillator need not be disposed close to the engine but can be located physically adjacent the proportional amplifier and the hydraulic cylinder which is being controlled.

It should be noted that because the present invention utilizes digital components for generating a standing wave pulse to control an analog component, the problems encountered because of distortion of a pure pressure signal by line losses and extended signal transmission times are circumvented. In this manner, application in a low pressure fluidic system requiring line lengths in excess of ten feet is not hindered.

In describing the present invention, although reference has been made to a preferred embodiment, it should be appreciated by one skilled in the art that various additions, deletions and modifications may be made.

What is claimed is:

1. A fluidic system for transmitting a fluidic signal through a conduit of substantial length, said system comprising:
   a source of fluid under pressure;
   a fluid pulse generating means associated with said source of fluid under pressure for generating a digital fluid pulse at a variable frequency, said fluid pulse generating means including output means;
   fluidic proportional amplifier means including a supply port, at least two output ports, and at least two control signal input ports in fluid communication with said supply and output ports;
   first conduit means connecting one of said control signal input ports to said output means of said fluid pulse generating means;
   means interposed in said first conduit for converting said digital fluid pulse to a first analog pressure signal;
   means for generating a second fixed analog pressure signal and directing it to the other of said control signal input ports including second conduit means;
   said fluidic proportional amplifier means being capable of varying the signals passing through said output ports in accordance with the difference between said first and second analog pressure signals.

2. A fluidic system according to claim 1 wherein said first conduit means further includes restriction means interposed between the output of said fluid pulse generating means and said proportional amplifier means.

3. A fluidic system according to claim 2 wherein said means for converting said digital fluid pulse to a first analog pulse includes fluidic capacitor means.

4. A fluidic system according to claim 3 wherein said means for generating a second, fixed analog pressure signal includes second fluid pulse generating means.

5. A fluidic system according to claim 4 wherein one of said first and second conduit means is substantially longer than the other of said conduit means.

6. A fluidic system according to claim 5 wherein said fluid pulse generating means includes a first bistable oscillator means.

7. A fluidic system according to claim 6 wherein said second fluid pulse generating means includes a second bistable oscillator means.

8. A fluidic system according to claim 7 wherein one of said oscillator means has a fixed capacitance and the other of said oscillator means has a variable capacitor adapted to be modulated in accordance with a parameter being monitored.

9. A fluidic control system adapted to control an element in accordance with a parameter being monitored, said system comprising:
   sensing means for monitoring the parameter, said sensing means including a fluid pulse generating means having output means and supply means connected to a source of fluid pressure to provide a digital fluid pulse;
   analog fluidic means remote from the parameter being monitored, said analog fluidic means having output port means, supply port means connected to a source of fluid under pressure, and two control signal input port means, all of said port means in fluid communication with each other;
   conduit means of a substantial length connecting said output means of said fluid pulse generating means and one of said control signal input port means of said analog means;
   means interposed in said conduit means for converting said digital fluid pulse to a first analog pressure signal; and
   means for generating a second, fixed analog pressure signal and directing the signal to the other of said control signal input port means;
   said analog fluidic means being capable of varying the signals through said output port means in accordance with the difference between said first and second analog pressure signals.

10. A method of monitoring a parameter by transmitting a low pressure fluidic signal through a conduit of a length greater than ten feet, said method comprising:
   generating a digital fluidic pulse so as to establish a standing wave form the frequency of which varies in accordance with the parameter being monitored;
   directing the pulse to a capacitor means the output of which is remote from the point of pulse generation to form a first analog pressure signal;
   directing the output of the capacitor means to one control signal input means of an analog fluidic means;
comparing the first analog pressure signal to a second, reference analog pressure signal; and
varying the output of the analog fluidic means in accordance with the difference between the two pressure signals, whereby the output varies according to the parameter being monitored.

References Cited

UNITED STATES PATENTS

| | | | |
|---|---|---|---|
| 3,075,548 | 1/1963 | Horton | 137—81.5 XR |
| 3,117,593 | 1/1964 | Sowers | 137—81.5 XR |
| 3,124,999 | 3/1964 | Woodward | 137—81.5 XR |
| 3,159,168 | 12/1964 | Reader | 137—81.5 |
| 3,228,410 | 1/1966 | Warren et al. | 137—81.5 |
| 3,266,510 | 8/1966 | Wadey | 137—81.5 |
| 3,273,377 | 9/1966 | Testerman et al. | 137—81.5 XR |
| 3,285,264 | 11/1966 | Boothe | 137—81.5 |
| 3,338,515 | 8/1967 | Dexter | 137—81.5 XR |
| 3,348,562 | 10/1967 | Ogren | 137—81.5 |
| 3,390,611 | 7/1968 | Warren | 137—81.5 XR |

OTHER REFERENCES

"Generating Timed Pneumatic Pulses," R. E. Norwood, I.B.M. Technical Disclosure Bulletin, vol. 5, No. 9, February 1963, pp. 13, 14.

SAMUEL SCOTT, Primary Examiner

U.S. Cl. X.R.

235—201